United States Patent Office 2,979,529
Patented Apr. 11, 1961

2,979,529

PRODUCTION OF DICYCLOPROPYL KETONES AND 1,7-DIHALO-4-HEPTANONES

Harold Hart, Auburndale, Mass., assignor to Research Corporation, New York, N.Y., a corporation of New York No Drawing. Filed Dec. 12, 1955, Ser. No. 552,253

4 Claims. (Cl. 260—586)

This invention relates to 1,7-dihalo-4-heptanones, to methods of making them and to cyclopropyl compounds obtainable therefrom.

It has been found that 1,7-dihalo-4-heptanones of the formula

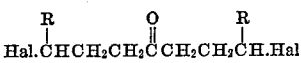

wherein R is hydrogen or lower alkyl and Hal is chlorine or bromine, can readily be produced in good yield by the treatment of dibutyrolactones

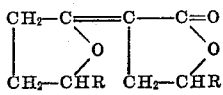

with hydrohalic acids.

The dibutyrolactones are obtained by treating lactones of γ-hydroxyalkanoic acids with alkali metal condensing agents such as sodium alcoholates, sodamide, sodium hydride and sodium triphenylmethyl. The dibutyrolactones thus produced do not need to be isolated but the reaction mixture can be treated directly with hydrohalic acid for production of the 1,7-dihalo-4-heptanones.

The 1,7-dihalo-4-heptanones are useful polyfunctional reactive intermediates. For example, on treatment with strong alkali metal hydroxides they are converted into dicyclopropyl ketones

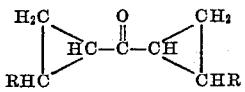

which can in turn be converted into a series of cyclopropyl compounds, such as dicyclopropyl carbinol and dicyclopropylmethane. Because of the reactivity of the ketone group the dicyclopropyl ketone makes it possible readily to introduce cyclopropyl groups into a wide variety of compounds.

The dicyclopropylketones are also useful as solvents for example, for cellulose esters, and for the solution of insecticides, such as DDT, in the formulation of insecticidal aerosol bomb compositions.

The following examples are illustrative of the principles of the invention:

(1) 1,7-dichloro-4-heptanone

To a solution of 23 g. (1.0 mole) of sodium in 400 ml. of absolute methanol there is added 172 g. (2 moles) of γ-butyrolactone, and the resulting solution is refluxed for three hours. The solvent is removed in vacuo. To the thick syrupy residue there is slowly added, with cooling and vigorous stirring, 500 ml. of concentrated hydrochloric acid. The mixture is refluxed for fifteen minutes, then extracted with ether. The ether extracts are dried over potassium carbonate and, after removal of the solvent, there is obtained 119 g. (66%) of 1,7-dichloro-4-heptanone, B.P. 106–110° C. at 4 mm., $n_D^{25}$ 1.4734.

(2) Dicyclopropyl ketone (a) *From 1,7-dichloro-4-heptanone.*—A mixture of 600 ml. of 20% sodium hydroxide and 165 g. (0.90 mole) of 1.7-dichloro-4-heptanone is refluxed, with vigorous stirring, for thirty minutes, then steam distilled until the characteristic odor of the ketone is absent from the distillate. The latter is then saturated with potassium carbonate, the upper layer separated, and the water layer extracted with ether. After drying with potassium carbonate and removal of the solvent, there is obtained 69 g. (70%) of dicyclopropyl ketone B.P. 69° C. at 20 mm., $n_D^{25}$ 1.4654. It distills without decomposition at atmospheric pressure, B.P. 162.5–163.0° C.

The 2,4-dinitrophenylhydrazone melts at 191.5–192.0° C.

The semicarbazone melts at 159–160.5° C.

(b) *Directly from γ-butyrolactone.*—Procedure (1) for the preparation of 1,7-dichloro-4-heptanone is followed through refluxing with concentrated hydrochloric acid. Then 480 g. of 50% aqueous sodium hydroxide is added, with cooling. The salt which precipitates does not interfere with the reaction. The mixture is refluxed for thirty minutes, then steam distilled and worked up as in the procedure immediately above. The overall yield of dicyclopropyl ketone (VII) varies from 50–60%.

(3) Dicyclopropylcarbinol

Dicyclopropyl ketone (44 g., 0.4 mole) is added dropwise over a period of thirty minutes to a suspension of 6 g. of lithium aluminum hydride in 250 ml. of ether. After refluxing for one hour, the mixture is worked up in the usual manner, using sodium hydroxide to dissolve the aluminum hydroxide, to give 40 g. (89%) of dicyclopropylcarbinol, B.P. 48° C. at 3 mm., $n_D^{25}$ 1.4620.

(4) Dicyclopropylmethane

A mixture of 35 g. (0.32 mole) of dicyclopropyl ketone, 300 ml. of diethylene glycol, 40 g. of potassium hydroxide and 40 ml. of 85% hydrazine hydrate are heated for one hour at 130° C. The excess hydrazine and water are removed until the pot temperature reaches 180° C., where it is maintained until all the product has distilled. The distillate is extracted with ether and, after drying with potassium carbonate and removal of the solvent, there is obtained 19 g. (63%) of dicyclopropylmethane, B.P. 102° C. at atmospheric pressure, $n_D^{25}$ 1.4228.

If other γ-hydroxyalkanoic acid lactones are substituted for γ-butyrolactone in the foregoing examples, the corresponding substituted 1,7-dichloro-4-heptanones and dicyclopropyl compounds are obtained. For example, starting with γ-valerolactone-2,8-dichloro-5-nonanone and di-(2-methylcyclopropyl)ketone are produced.

I claim:

1. The method of making 1,7-dihalo-4-heptanones of the formula

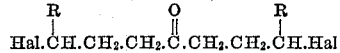

wherein R is a member of the group consisting of hydrogen and lower alkyl radicals and Hal is a halogen of the group consisting of chlorine and bromine which comprises heating a γ-dibutyroalactone of the formula

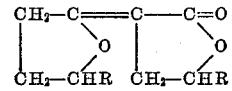

with a hydrohalic acid of the group consisting of hydrochloric and hydrobromic acids.

2. The method of making 1,7-dichloro-4-heptanone which comprises heating γ-dibutyrolactone with hydrochloric acid.

3. The method of making dicyclopropyl ketones of the formula

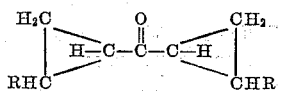

wherein R is a member of the group consisting of hydrogen and lower alkyl radicals which comprises heating a γ-butyrolactone of the formula

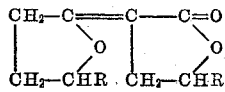

with a hydrohalic acid of the group consisting of hydrochloric and hydrobromic acids and thereafter heating the reaction product with an aqueous alkali metal hydroxide solution.

4. The method of making dicyclopropyl ketone which comprises heating γ-dibutyrolactone with hydrochloric acid and heating the reaction product with an aqueous alkali metal hydroxide solution.

References Cited in the file of this patent
UNITED STATES PATENTS 2,497,483   Wilzbach _____ Feb. 14, 1950